(12) United States Patent
Okuley et al.

(10) Patent No.: US 8,891,231 B2
(45) Date of Patent: Nov. 18, 2014

(54) HINGE CONFIGURATION FOR AN ELECTRONIC DEVICE

(75) Inventors: James M. Okuley, Portland, OR (US); Kimi Jensen, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 13/562,289

(22) Filed: Jul. 30, 2012

(65) Prior Publication Data
US 2014/0029187 A1    Jan. 30, 2014

(51) Int. Cl.
*G06F 1/16*        (2006.01)

(52) U.S. Cl.
USPC .............. 361/679.26; 362/364; 318/400.26; 439/405; 455/67.14

(58) Field of Classification Search
USPC ............. 455/67.14, 552.1, 41.2, 411, 556.1, 455/569.1, 557, 450, 566, 426.1, 418; 439/607.01, 55, 620.22, 331, 405, 73, 439/76.2, 492, 630, 76.1, 330; 174/50.5, 174/541, 520, 359, 261, 562, 59, 71 R; 318/3, 400.26, 139, 400.07; 362/136, 362/364, 382, 97.3; 361/679.27, 679.02, 361/679.21, 679.22, 679.55, 679.54, 361/679.36, 679.41, 679.09, 679.29, 361/679.26, 679.28
See application file for complete search history.

(56) References Cited

U.S. PATENT DOCUMENTS

| | | | |
|---|---|---|---|
| 5,548,478 A | 8/1996 | Kumar et al. | |
| D425,874 S | 5/2000 | Tanimura | |
| 6,091,600 A | 7/2000 | Jeong | |
| 6,785,128 B1 * | 8/2004 | Yun | 361/679.27 |
| 6,816,365 B2 | 11/2004 | Hill et al. | |
| 7,393,115 B2 * | 7/2008 | Tokushita et al. | 362/136 |
| D615,539 S | 5/2010 | Jen | |
| D616,883 S | 6/2010 | Denhez et al. | |
| D631,472 S | 1/2011 | Kawase et al. | |
| 8,081,438 B2 | 12/2011 | Karashima et al. | |
| 2005/0041378 A1 | 2/2005 | Hamada et al. | |
| 2010/0190516 A1 | 7/2010 | Hawkins et al. | |
| 2012/0030930 A1 | 2/2012 | Theobald et al. | |
| 2012/0176741 A1 | 7/2012 | Wu et al. | |

FOREIGN PATENT DOCUMENTS

| | | | |
|---|---|---|---|
| KR | 20-1999-0004641 U | 2/1999 | |
| KR | 20-1999-0041859 U | 12/1999 | |

OTHER PUBLICATIONS

Notice of Allowance received for U.S. Appl. No. 29/428,400, mailed on Jul. 25, 2013, 9 pages.
International Search Report and Written Opinion received for PCT Patent Application No. PCT/US2013/048271, mailed on Oct. 22, 2013, 9 pages.

(Continued)

*Primary Examiner* — Hung Duong
(74) *Attorney, Agent, or Firm* — Patent Capital Group

(57) ABSTRACT

Particular embodiments described herein provide for an electronic device, such as a notebook computer or laptop, that includes a circuit board coupled to a plurality of electronic components (which includes any type of components, elements, circuitry, etc.). The electronic device may also include a base portion and a lid portion coupled to the base portion at a hinge configured such that the base portion and the lid portion can rotate between an open configuration of the electronic device and a closed configuration of the electronic device. The lid portion can include at least one segment that is to raise at least a portion of the base portion in response to a rotation toward the open configuration (e.g., opening the lid portion to access a touchpad or a keyboard of the electronic device, or to see a display of the electronic device).

24 Claims, 8 Drawing Sheets

(56) References Cited

OTHER PUBLICATIONS

"Thunderbolt (interface)" retrieved Aug. 7, 2012 from Wikipedia at http://en.wikipedia.org/wiki/Thunderbolt_%28interface%29 ; 7 pages.

Nelson, Tom, "What is Thunderbolt High Speed I/O?", retrieved Aug. 7, 2012 from http://macs.about.com/od/faq1/f/What-Is-Thunderbolt-High-Speed-I-O.htm ; 2 pages.

Intel Corporation Technology Brief, "Thunderbolt Technology", copyright 2012. Retrieved Aug. 7, 2012 from http://www.intel.com/content/dam/doc/technology-brief/thunderbolt-technology-brief.pdf ; 4 pages.

VAIO 13.1" Z Series Laptop; retrieved Jul. 31, 2012 from http://store.sony.com/webapp/wcs/stores/servlet/ProductDisplay?catalogId=10551&storeId=10151&langId=-1&productId=8198552921666449851#additionalImage1 , 3 pages.

\* cited by examiner

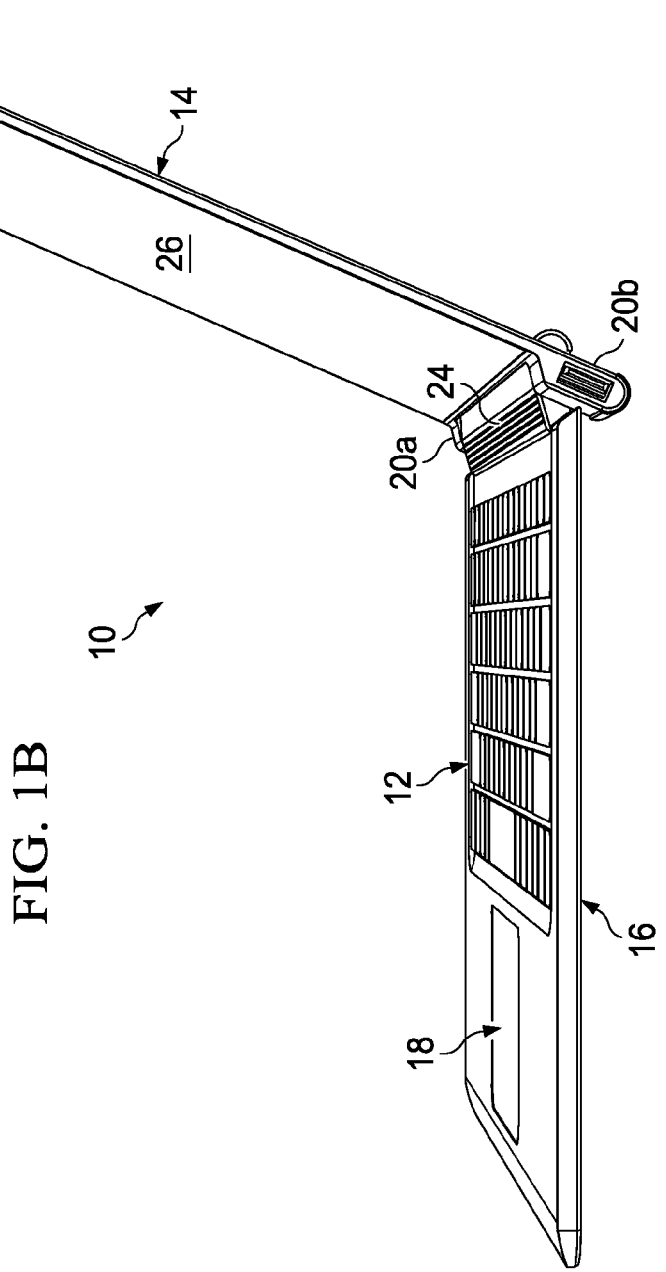

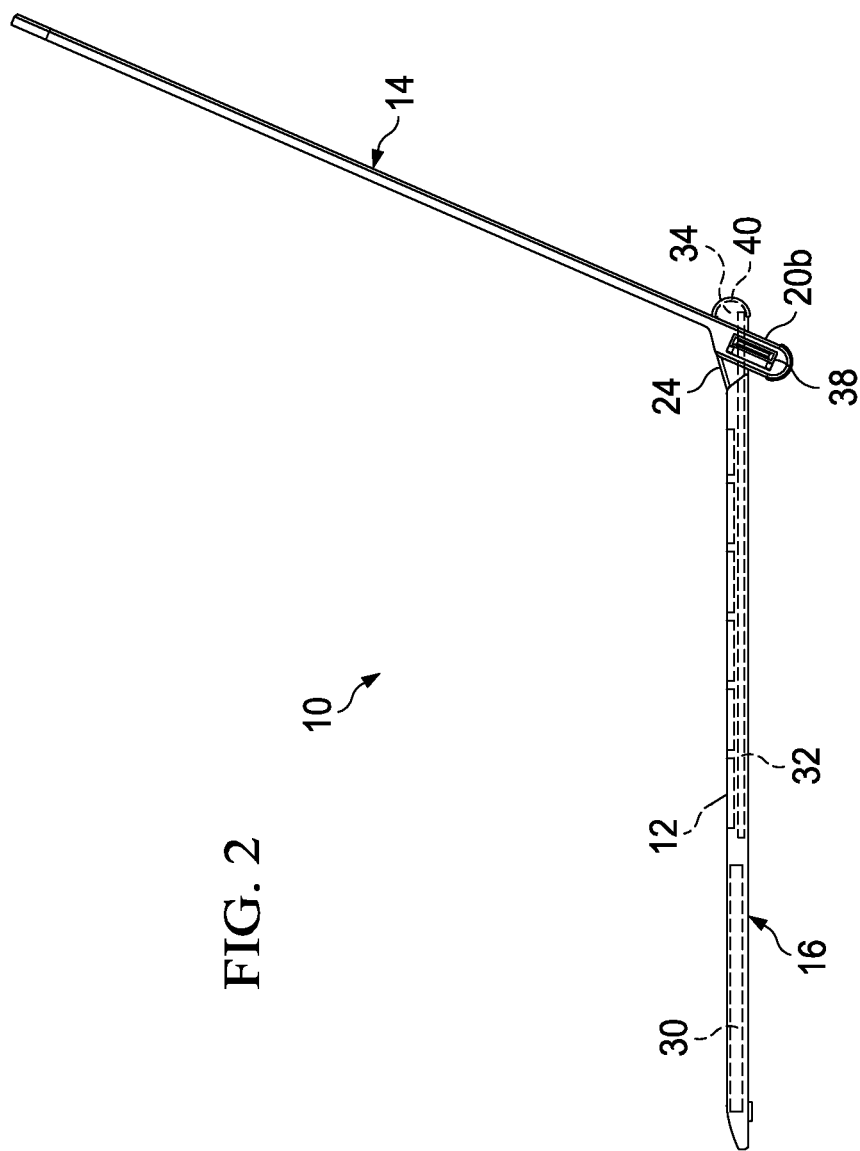

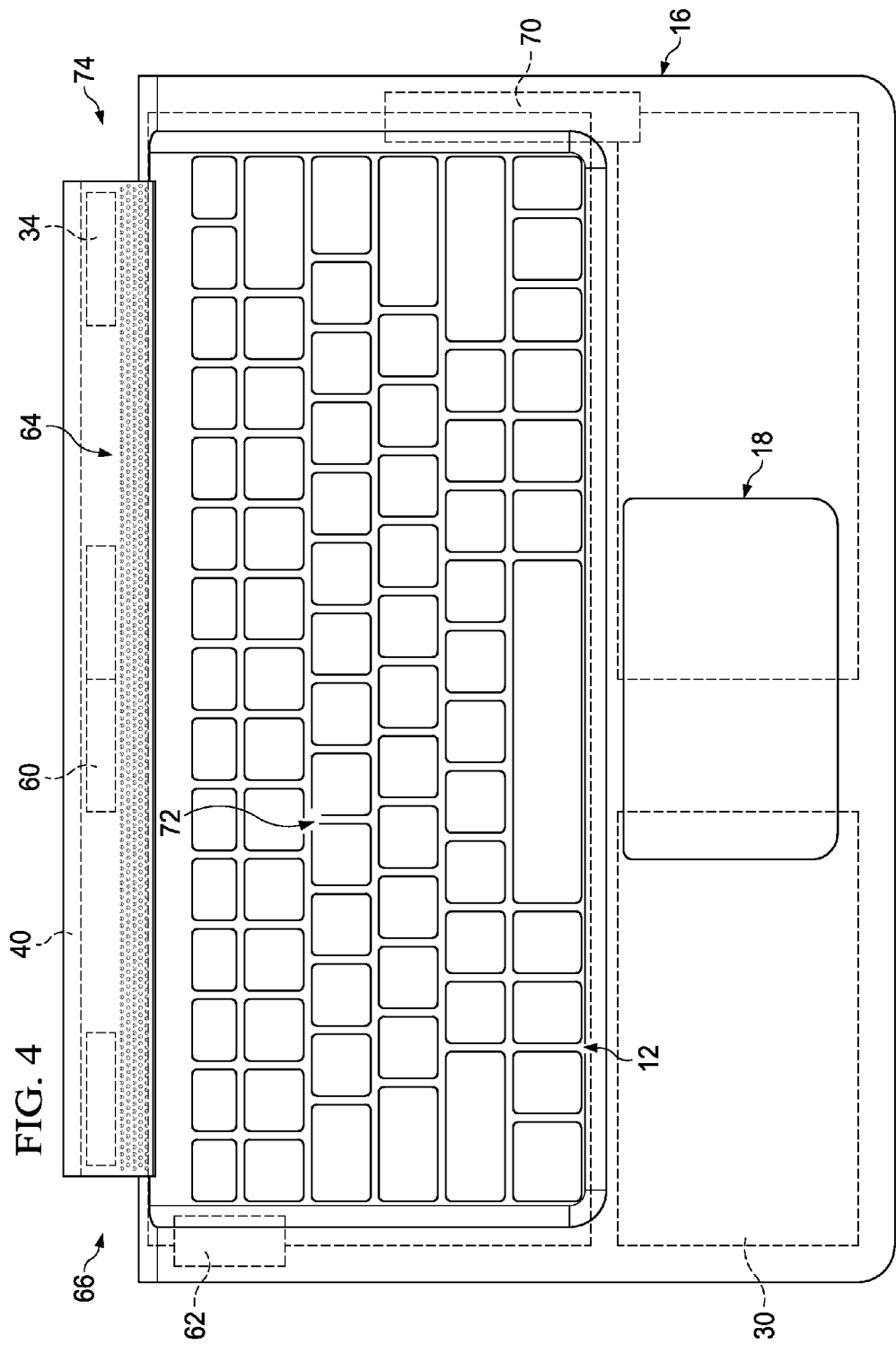

ly relate to hinge
HINGE CONFIGURATION FOR AN ELECTRONIC DEVICE

TECHNICAL FIELD

Embodiments described herein generalconfigurations for an electronic device.

BRIEF DESCRIPTION OF THE DRAWINGS

Embodiments are illustrated by way of example and not by way of limitation in the FIGURES of the accompanying drawings, in which like references indicate similar elements and in which:

FIG. 1B is a simplified schematic diagram illustrating a side view of the electronic device;

FIG. 2 is a simplified schematic diagram illustrating a side view of the electronic device in accordance with one example implementation;

FIG. 4 is a simplified schematic diagram illustrating a top view of the electronic device.

Figure 1A:
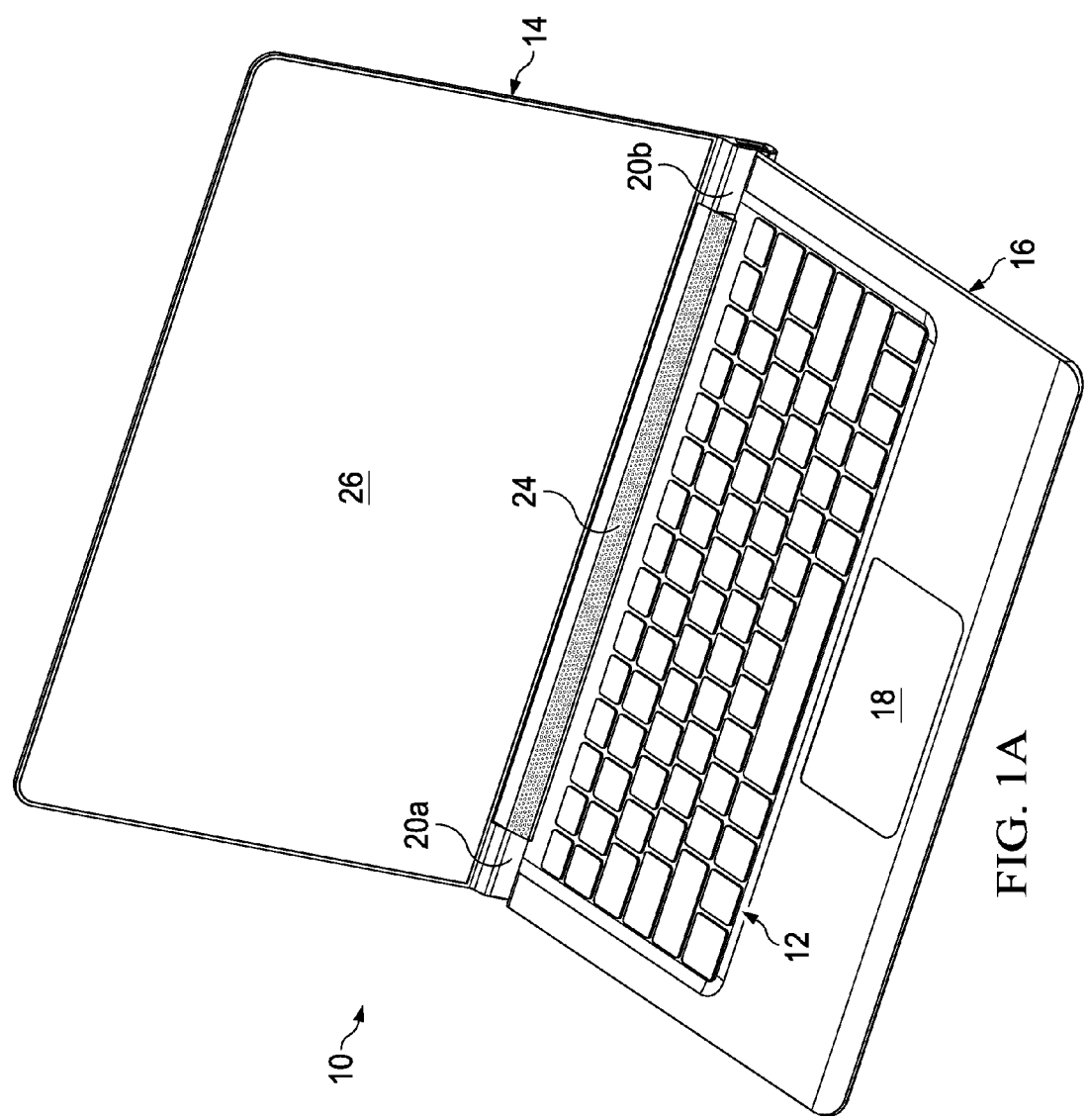
FIG. 1A is a simplified schematic diagram illustrating an embodiment of an electronic device in an open configuration in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

The following detailed description sets forth example embodiments of apparatuses, methods, and systems relating to hinge configurations for an electronic device. Features such as structure(s), function(s), and/or characteristic(s), for example, are described with reference to one embodiment as a matter of convenience; various embodiments may be implemented with any suitable one or more of the described features.

Traditional electronic devices (e.g., laptops, notebook computers, etc.) rest on a flat surface as a user types on the keyboard, utilizes a touchpad, swipes an interface, etc. In this rigid horizontal plane of work, the user can experience muscle strain, eyestrain, etc. while working on the electronic device. Moreover, a pure horizontal work plane does not contour to the natural human form for hands and arms. Additionally, the direct contact of the electronic device with the tabletop surface (on which it sits) inhibits the performance of antenna systems of the electronic device. For example, any composite material that is within the tabletop surface can create a disturbance that affects antenna performance (e.g., due to electromagnetic induction, electromagnetic radiation being emitted, etc.). The disturbance may interrupt, obstruct, degrade, or otherwise limit the effective performance of the antenna circuits. These effects can range from a simple degradation of data to a total loss of data. Hence, there are several drawbacks associated with current electronic device designs that rest flush on a tabletop surface on which they are used.

Particular embodiments described herein provide for an electronic device, such as a notebook computer or laptop, that includes a circuit board coupled to a plurality of electronic components (which includes any type of components, elements, circuitry, etc.). The electronic device may also include a base portion and a lid portion coupled to the base portion at a hinge configured such that the base portion and the lid portion can rotate between an open configuration of the electronic device and a closed configuration of the electronic device. The lid portion can include at least one segment that is to raise at least a portion of the base portion in response to a rotation toward the open configuration (e.g., opening the lid portion to access a touchpad or a keyboard of the electronic device, or to see a display of the electronic device).

In more particular embodiments, the at least one segment comprises a first foot segment and a second foot segment. The first foot segment and the second foot segment are operable to contact a surface on which the electronic device is to rest. The first foot segment can include a Universal Serial Bus (USB) connector that rotates as the lid portion rotates. Additionally, the second foot segment can include an audio jack connector that rotates as the lid portion rotates.

In yet other implementations, the base portion includes a keyboard that slopes in a downward direction in response to raising the base portion. A middle portion can be provided between the base portion and the lid portion, where the middle portion provides for a venting activity associated with cooling electronic components provided in the apparatus.

An antenna can be coupled to the base portion, where the antenna can be raised as the lid portion is raised such that a distance is created between the antenna and a surface on which the apparatus rests as the lid portion moves to the open configuration. In particular implementations, a height of the antenna defines a maximum thickness associated with the apparatus.

In other example embodiments, the lid portion does not completely overlap the base portion. Additionally, a motherboard can be provided in the base portion and a keyboard can be disposed on top of the base portion. The motherboard can extend under the keyboard and then extend past a point of rotation for the hinge. An intersection can be defined at the hinge such that ends of the lid portion and the base portion extend past each other in the open configuration. In the closed configuration, the ends of the lid portion and the base portion are substantially flush with each other.

Hinge Configuration for Electronic Device

FIG. 1A is a simplified schematic diagram illustrating an embodiment of an electronic device 10 in an open configuration in accordance with one embodiment of the present disclosure. Electronic device 10 may include a keyboard 12, a base portion 16, a touchpad 18, and a lid portion 14, which may include a display 26. Display 26 may be disposed within/on and/or supported by lid portion 14. In one or more embodiments, display 26 is a screen that can be a liquid crystal display (LCD) display screen, a light-emitting diode (LED) display screen, an organic light-emitting diode (OLED) display screen, a plasma display screen, or any other suitable display screen system.

In one or more embodiments, electronic device 10 is a notebook computer or laptop computer. In still other embodiments, electronic device 10 may be any suitable electronic device having a display such as a mobile device, a tablet computer and/or a tablet device (e.g., an i-Pad), a personal digital assistant (PDA), a smartphone, etc.

Electronic device 10 may also include a middle portion 24 that is provided between base portion 16 and lid portion 14. Middle portion 24 may aesthetically cover a hinge (or multiple hinges) that exists between base portion 16 and lid portion 14. The hinge can define an axis of rotation that is shared between base portion 16 and lid portion 14. In one embodiment, base portion 16 and lid portion 14 are hingedly coupled via multiple hinges (hidden from view) in a clamshell configuration. Note that in the example embodiment of FIG. 1A, lid portion 14 does not overlap the entire system, as typically would be seen in laptop computer designs.

On the outside of middle portion 24 are multiple foot segments 20a-20b. In a particular implementation, foot segments 20a-20b are integral to lid portion 14. In other implementations, foot segments 20a-20b are suitably coupled to lid portion 14 in any appropriate manner. In operation, as lid portion 14 is opened, foot segments 20a-2-b can contact (e.g., grip, interface, meet with, etc.) a surface on which electronic device 10 is placed. By opening lid portion 14 (and, therefore, opening electronic device 10, foot segments 20a-20b of lid portion 14 effectively raise keyboard 12 a certain height. This slight angulation (e.g., between a tabletop surface and the bottom of electronic device 10) can provide an ergonomic characteristic for an end user during typing activities. Additionally, this slight angulation can provide an insulating distance to minimize electromagnetic interference associated with antenna systems of electronic device 10, as further detailed below.

Figure 1C:
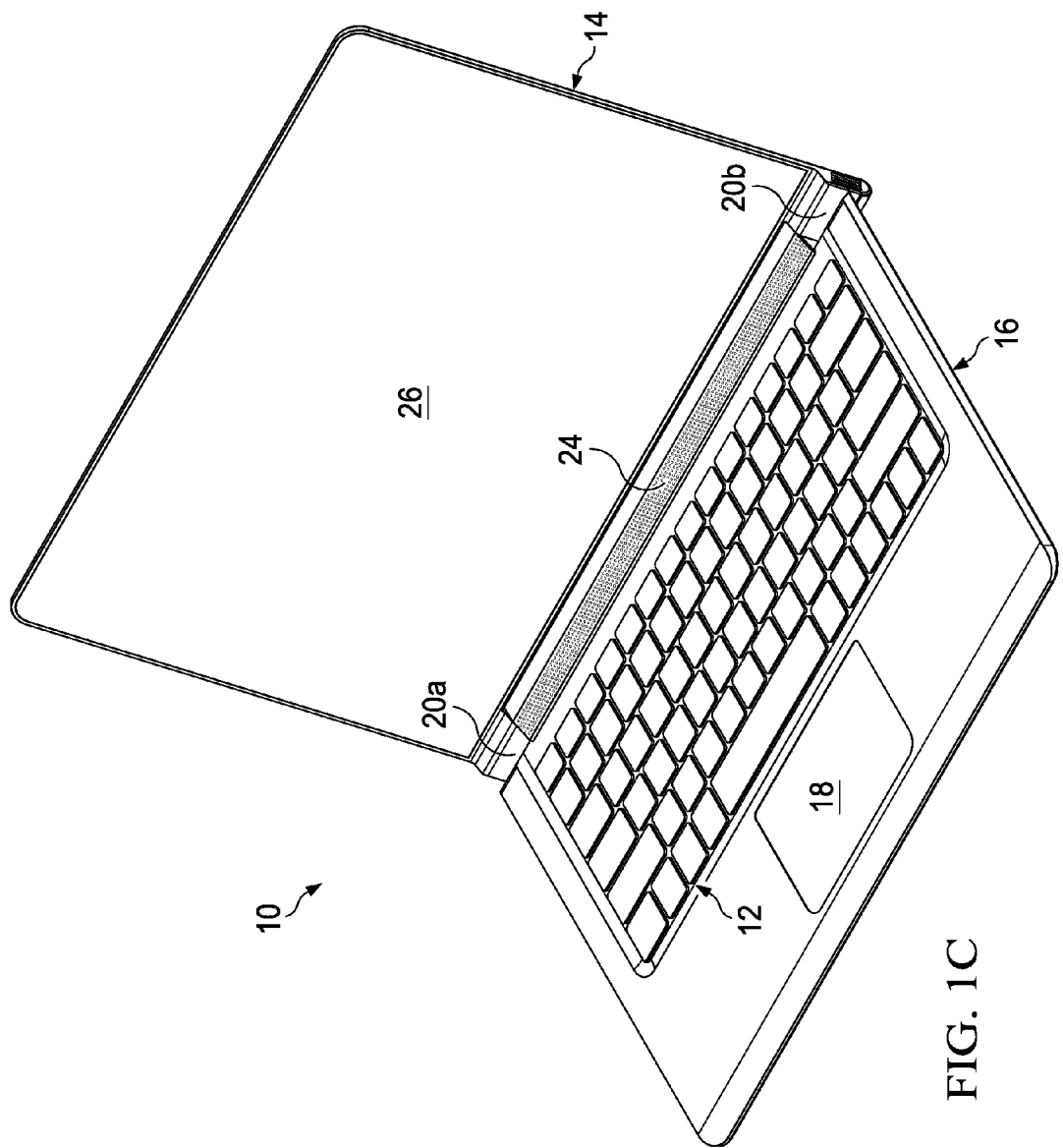
FIG. 1C is a simplified schematic diagram illustrating an orthogonal view of the electronic device.
Figure 1D:
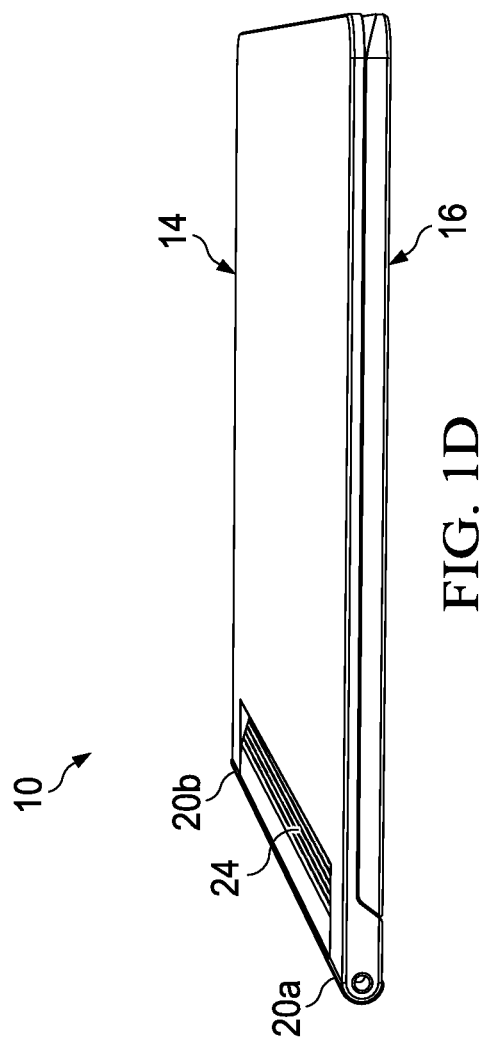
FIG. 1D is a simplified schematic diagram illustrating a side view of the electronic device in a closed position.
Figure 1E:
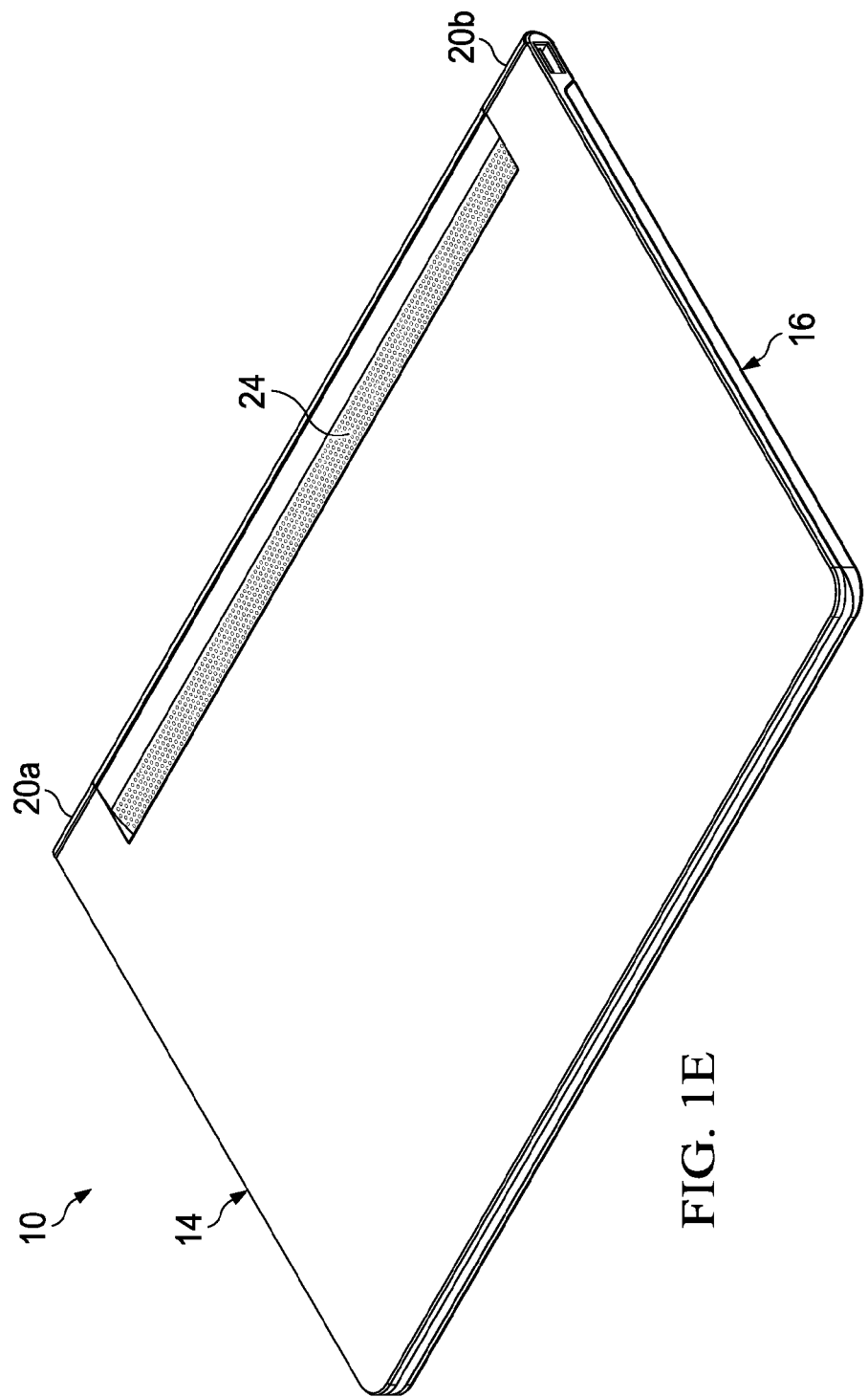
FIG. 1E is a simplified orthogonal view of the electronic device in a closed position.

Turning to FIG. 1B, FIG. 1B is a simplified schematic diagram illustrating a side view of electronic device 10. FIG. 1C is a simplified schematic diagram illustrating an orthogonal view of electronic device 10. FIG. 1D is a simplified schematic diagram illustrating a side view of electronic device 10 when electronic device 10 is in a closed position. In the closed position, an obtuse angle is formed between the surfaces of lid portion 14 and base portion 16, as is depicted. FIG. 1E is a simplified orthogonal view of electronic device 10 when it is in a closed position. Again, the obtuse angle is being depicted as the surfaces of base portion 16 and lid portion 14 come together in the closed configuration.

Turning to FIG. 2, FIG. 2 is a simplified schematic diagram illustrating a side view of electronic device 10 in accordance with one example implementation. This particular embodiment includes a battery 30, a motherboard 32, a thermal spreader 34, a plurality of connectors 38 (e.g., Universal Serial Bus (USB) connectors (e.g., in compliance with the USB 3.0 Specification), Thunderbolt™ connectors, WiFi connectors, a non-standard connection point such as a docking connector, etc.), and a plurality of antennas 40. [Thunderbolt™ and the Thunderbolt logo are trademarks of Intel Corporation in the U.S. and/or other countries.]

In one example embodiment, motherboard 32 is a general circuit board that can hold various components of the internal electronic system of electronic device 10. The components may include a central processing unit (CPU), a memory, etc. Motherboard 32 can also couple to one or more connectors 38 in order to accommodate other peripherals sought to be used by a user of electronic device 10. More specifically, motherboard 32 can provide the electrical connections by which the other components of the system can communicate.

Any processors (inclusive of digital signal processors, microprocessors, supporting chipsets, etc.), memory elements, etc. can be suitably coupled to motherboard 32 based on particular configuration needs, processing demands, computer designs, etc. Other components such as external storage, controllers for video display, sound, and peripheral devices may be attached to motherboard 32 as plug-in cards, via cables, or integrated into the motherboard itself.

Antennas 40 are electrical components that convert electric currents into radio waves. In a particular embodiment, antennas 40 are encompassed within a slightly arcing design, as is being illustrated in FIG. 2. Alternatively, any suitable housing, design, configuration, arrangement, etc. can be used in order to deploy antennas 40. Antennas 40 can be used for both transmitting and receiving signals. In particular examples, antennas 40 can be associated with WiFi activities, wireless connections more generally, small cell deployments, Bluetooth, 802.11, etc.

In operation, as lid portion 14 effectively opens electronic device 10 into an open configuration, antennas 40 are slightly raised from the surface on which electronic device 10 is resting. The distance between this surface and antennas 40 can provide an insulating barrier that inhibits interference associated with antenna performance. For example, any tabletop surface that includes conductive materials (e.g., metal, alloys, composites, etc.) would interfere with antenna activity. By slightly raising antennas 40 as lid portion 14 is opened, such interference is effectively minimized. In more specific embodiments, the actual antenna design/structure accounts for the entire maximum thickness of electronic device 10. This height allows for more internal real estate for motherboard components. The antennas themselves can be any suitable combination of aluminum, composite, plastics, etc.

In a particular embodiment, motherboard 32 extends under keyboard 12, past the point of rotation for the hinge. Bottom portion 16 includes antenna 40, which can extend past a vertical plane coincident with lid portion 14. Hence, an intersection is defined at the hinge, where the respective ends of lid portion 14 and base portion 16 extend past each other. In at least a general sense, an X-configuration is being defined between an end of lid portion 14 and an end of base portion 16. As electronic device 10 moves from the open position to the closed position, the back ends of base portion 16 and lid portion 14 create a scissor-like paradigm. In the fully closed position, these back ends are flush, which can provide an aesthetic characteristic for electronic device 10.

Connectors 38 can rotate with lid portion 14, as the lid is opened and closed. Note that any suitable input/output (I/O) connectors (e.g., USB, Thunderbolt™, audio connectors, etc.) can be provisioned within electronic device 10. In a particular implementation, an audio jack connector may be provided on a surface of foot segment 20a, while a USB connector may be provided on a surface of foot segment 20b. Note that power can flow through the USB connector, as it is not necessary to have a separate power jack in certain embodiments of the present disclosure.

Figure 3:
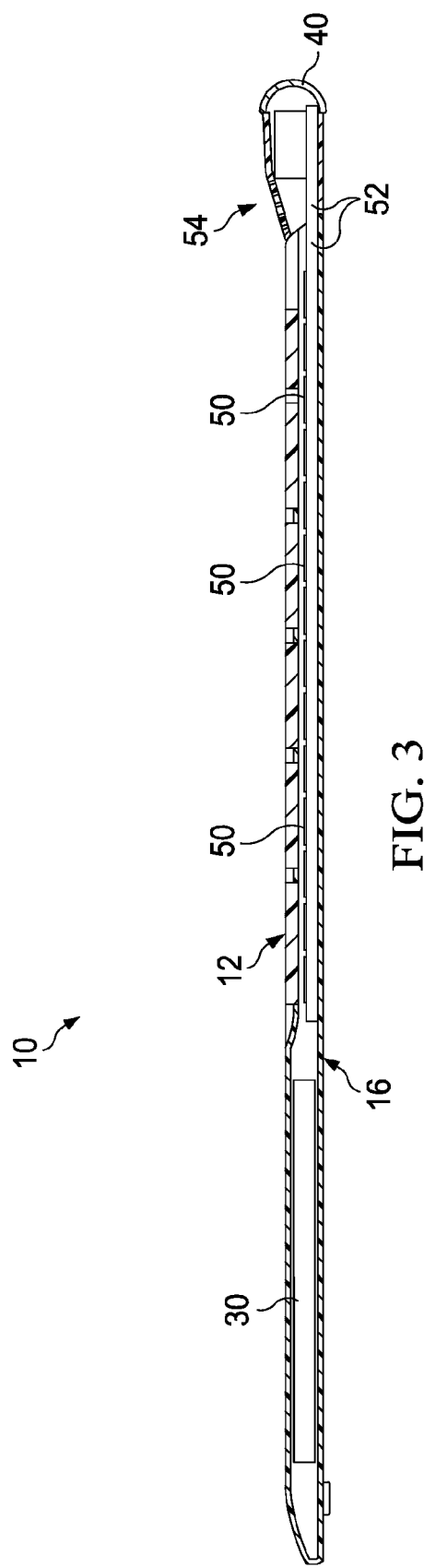
FIG. 3 is a simplified schematic diagram illustrating a side view of the electronic device in accordance with one embodiment of the present disclosure.

Turning to FIG. 3, FIG. 3 is a simplified schematic diagram illustrating a side view of electronic device 10 in accordance with one embodiment of the present disclosure. It should be noted that in typical laptop computer configurations, electronic components are arbitrarily positioned under the keyboard in a limited spatial area. Stated in different terminology, the components are simply positioned based on a best-fit scenario in the context of limited circuit board real estate. One objective in designing any laptop computer is to engender a user experience that is uncompromised by space constraints, processing activities, display area, etc. imposed by the components themselves. In contrast to other systems, the motherboard component placement layout of electronic device 10 is optimized and, furthermore, arranged according to component heights or sizes to properly fit into the system. This is generally being illustrated at an arrow 52 of FIG. 3.

Note that the top row of function keys on keyboard 12 is strategically designed to allow taller components to be inserted in the area under these keys. For example, additional components can be positioned below the function keys and can suitably be coupled to motherboard 32. Hence, an arrow 56 is generally indicating the top row function keys on the keyboard, which are designed with less key travel to allow additional space for the motherboard components.

In this particular example of FIG. 3, motherboard routing traces can extend under keyboard 12, as generally indicated by an arrow 50. In a particular embodiment, where there is limited space for components under keyboard 12, components can be strategically positioned in other areas of electronic device 10. This allows for a smaller, tighter motherboard configuration. In one particular implementation, thermal spreader 34 is provisioned in the thicker area of the hinge of electronic device 10 (i.e., in middle portion 24). The full system height for the CPU package and thermal spreader is shown generally at an arrow 54.

Turning to FIG. 4, FIG. 4 is a simplified schematic diagram illustrating a top view of electronic device 10. This particular embodiment includes a plurality of taller motherboard components 62 (positioned next to the keyboard), a plurality of speakers and thermal vents 64, and a plurality of input/output (I/O) connections and lid hinges that are generally shown at an arrow 66. Also provided in FIG. 4 are additional battery motherboard components 70. These additional motherboard components could be replaced by additional antennas, additional components, etc. An arrow 70 generally indicates the motherboard extending under the keyboard to allow for appropriate routing. In addition, FIG. 4 includes a USB connector 74, along with an I/O on the lid provided in the same area.

The particular embodiment of FIG. 4 also includes a system on chip (SOC) central processing unit (CPU) package 60. An SOC represents an integrated circuit (IC) that integrates components of a computer or other electronic system into a single chip. It may contain digital, analog, mixed-signal, and often radio frequency functions: all of which may be provided on a single chip substrate.

Note that as ambient air flows through the back of electronic device 10 (both on the left and right side of middle portion 24), a chimney effect is achieved for venting and cooling purposes. In one particular implementation, a fan would not be necessary in electronic device 10 based on this venting. In alternative embodiments, a fan can be positioned at the top of base portion 16 (e.g., positioned based on its height). The actual venting can be dual-purpose, providing speaker ventilation, along with helping to aerate the system from several sides.

In a particular embodiment, touchpad 18 is a pointing device that features a tactile sensor, a specialized surface that can translate the motion and position of a user's fingers to a relative position on screen. Touchpad 18 can be used in place of a mouse (e.g., where desk space is scarce or based on user preference). Touchpad 18 can operate using capacitive sensing, conductance sensing, or any other appropriate sensing technology. In a particular embodiment, battery 30 can be provisioned proximate to touchpad 18 in order to power its operations.

Although in the embodiments illustrated in FIGS. 1A-4 foot segments 20a-20b are illustrated as being generally rectangular in shape, in still other embodiments of electronic device 10, foot segments 20a-20b can be of any suitable size, shape, dimensions, placements, etc. For example, these foot segments 20a-20b can be oval, square, generally rectangular with rounded corners, or any other suitable shapes.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

One particular example implementation may include means for contacting a surface on which an electronic device is to rest in response to an actuation of a hinge of the electronic device, which includes a lid portion and a base portion. In addition, this particular embodiment may also include means for raising at least a portion of the base portion a distance from the surface on which the electronic device is to rest when the electronic device is in an open configuration. In more specific implementations, the lid portion comprises a first foot segment and a second foot segment for contacting the surface. Additionally, the first foot segment can include a USB connector or a Thunderbolt™ connector that is to rotate as the lid portion rotates. In addition, the base portion and the lid portion can rotate between the open configuration and a closed configuration.

What is claimed is:

1. An electronic device, comprising:
 a circuit board coupled to a plurality of electronic components;
 a base portion; and
 a lid portion coupled to the base portion at a hinge configured such that the base portion and the lid portion can rotate between an open configuration of the electronic device and a closed configuration of the electronic device, wherein the lid portion includes at least one segment that is to raise at least a portion of the base portion in response to a rotation toward the open configuration.

2. The electronic device of claim 1, wherein the at least one segment comprises a first foot segment and a second foot segment, and wherein the first foot segment and the second foot segment are operable to contact a surface on which the electronic device is to rest.

3. The electronic device of claim 2, wherein the first foot segment includes a Universal Serial Bus (USB) connector or a Thunderbolt™ connector that is to rotate as the lid portion rotates.

4. The electronic device of claim 2, wherein the second foot segment includes an audio jack connector that is to rotate as the lid portion rotates.

5. The electronic device of claim 1, wherein the base portion includes a keyboard that is to slope relative to a surface on which the electronic device is to rest when the electronic device is in the open configuration.

6. The electronic device of claim 1, further comprising:
a middle portion provided between the base portion and the lid portion, wherein the middle portion is to provide for a venting activity associated with the plurality of electronic components.

7. The electronic device of claim 1, further comprising:
an antenna coupled to the base portion, wherein the antenna is to be raised as the lid portion is raised to increase a distance between the antenna and a surface on which the electronic device is to rest.

8. The electronic device of claim 7, wherein a height of the antenna defines a thickness associated with the electronic device.

9. The electronic device of claim 1, wherein an end portion of the base portion extends past a surface of the lid portion when the electronic device is in the open configuration.

10. The electronic device of claim 1, wherein the lid portion does not completely overlap the base portion in the closed configuration.

11. The electronic device of claim 1, further comprising:
a motherboard provided in the base portion; and
a keyboard disposed on top of the base portion, wherein the motherboard extends under the keyboard and then extends past a point of rotation for the hinge.

12. The electronic device of claim 1, wherein an intersection is defined at the hinge such that ends of the lid portion and the base portion extend past each other in the open configuration.

13. The electronic device of claim 12, wherein the ends of the lid portion and the base portion are substantially flush when the electronic device is in the closed configuration.

14. An electronic device, comprising:
a base portion;
a lid portion; and
a hinge coupled to the base portion and the lid portion, wherein actuation of the hinge toward an open configuration is to cause at least a portion of the base portion to be raised from a surface on which the electronic device is to rest.

15. The electronic device of claim 14, wherein the base portion and the lid portion can rotate between the open configuration and a closed configuration.

16. The electronic device of claim 14, wherein an intersection is defined at the hinge such that ends of the lid portion and the base portion extend past each other when the electronic device is in the open configuration.

17. The electronic device of claim 16, wherein the ends of the lid portion and the base portion are substantially flush when the electronic device is in the closed configuration.

18. The electronic device of claim 14, further comprising:
an antenna coupled to the base portion, wherein the antenna is to raise as the lid portion is raised to increase a distance between the antenna and the surface on which the electronic device is to rest.

19. The electronic device of claim 18, wherein a height of the antenna defines a thickness associated with the electronic device.

20. The electronic device of claim 14, further comprising:
a connector that is to rotate as the lid portion rotates.

21. A method, comprising:
contacting a surface on which an electronic device is to rest in response to an actuation of a hinge of the electronic device, which includes a lid portion and a base portion; and
raising at least a portion of the base portion a distance from the surface on which the electronic device is to rest when the electronic device is in an open configuration.

22. The method of claim 21, wherein the lid portion comprises a first foot segment and a second foot segment for contacting the surface.

23. The method of claim 22, wherein the first foot segment includes a Universal Serial Bus (USB) connector or a Thunderbolt™ connector that is to rotate as the lid portion rotates.

24. The method of claim 21, wherein the base portion and the lid portion can rotate between the open configuration and a closed configuration of the electronic device.

* * * * *